United States Patent
Tehran et al.

(10) Patent No.: US 11,296,427 B2
(45) Date of Patent: Apr. 5, 2022

(54) ANTENNA SYSTEM HARDWARE PIECE FOR TERAHERTZ (THZ) COMMUNICATION

(71) Applicant: Samsung Electronics Co., Ltd., Suwon-si (KR)

(72) Inventors: Hamid Reza Memar Zadeh Tehran, Frisco, TX (US); Gary Xu, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 101 days.

(21) Appl. No.: 16/808,243

(22) Filed: Mar. 3, 2020

(65) Prior Publication Data

US 2020/0343648 A1 Oct. 29, 2020

Related U.S. Application Data

(60) Provisional application No. 62/838,368, filed on Apr. 25, 2019.

(51) Int. Cl.
*H01Q 13/16* (2006.01)
*H01Q 21/06* (2006.01)
(Continued)

(52) U.S. Cl.
CPC .......... *H01Q 21/064* (2013.01); *H01Q 1/24* (2013.01); *H01Q 1/246* (2013.01); *H01Q 13/16* (2013.01); *H01Q 21/06* (2013.01); *H04W 88/08* (2013.01)

(58) Field of Classification Search
CPC ...... H01Q 21/064; H01Q 1/246; H01Q 13/16; H01Q 1/24; H04W 88/08
(Continued)

(56) References Cited

U.S. PATENT DOCUMENTS 5,914,693 A * 6/1999 Takei .................. H01Q 13/16
343/767
5,977,924 A * 11/1999 Takei ................ H01Q 21/068
343/700 MS
(Continued)

FOREIGN PATENT DOCUMENTS

EP 2797169 A1 10/2014
KR 10-2010-0034227 A 4/2010
(Continued)

OTHER PUBLICATIONS

International Search Report of the International Searching Authority in connection with International Patent Application No. PCT/KR2020/005355 dated Aug. 3, 2020, 3 pages.
(Continued)

*Primary Examiner* — Hai V Tran

(57) ABSTRACT

An antenna and a base station including the antenna. The antenna includes a unit cell including a radiating element, a dielectric substrate, and a feed network. The radiating element includes first and second slots. The dielectric substrate includes a central cavity filled with a dielectric element. The feed network is proximate to the central cavity between the dielectric element and the radiating element and includes first and second horizontal feeds and first and second vertical feeds. The first and second horizontal feeds are separated by an air gap and a first vertical feed to feed a transmission to the first slot. The first and second vertical feeds are connected to the first and second horizontal feeds, respectively, and connected to feed first and second portions of the radiating element, respectively.

20 Claims, 11 Drawing Sheets

(51) Int. Cl.
*H01Q 1/24* (2006.01)
*H04W 88/08* (2009.01)

(58) Field of Classification Search
USPC .......................................................... 343/770
See application file for complete search history.

(56) References Cited

U.S. PATENT DOCUMENTS

| | | | |
|---|---|---|---|
| 6,239,762 B1 * | 5/2001 | Lier | H01Q 13/10 |
| | | | 343/700 MS |
| 8,197,887 B1 * | 6/2012 | Burckel | G02B 1/007 |
| | | | 427/97.7 |
| 8,665,158 B2 | 3/2014 | Chung et al. | |
| 9,525,211 B2 | 12/2016 | Lee et al. | |
| 9,680,211 B2 | 6/2017 | Kletsov et al. | |
| 10,312,601 B2 | 6/2019 | Zhai et al. | |
| 2008/0204326 A1 * | 8/2008 | Zeinolabedin Rafi | |
| | | | H01Q 9/0414 |
| | | | 343/700 MS |
| 2010/0073238 A1 | 3/2010 | Jun et al. | |
| 2012/0293279 A1 | 11/2012 | Gong et al. | |
| 2013/0236189 A1 * | 9/2013 | Yamamoto | H04B 10/808 |
| | | | 398/116 |
| 2015/0009079 A1 | 1/2015 | Bøjer | |
| 2015/0349425 A1 | 12/2015 | Kitchener | |
| 2016/0028166 A1 | 1/2016 | Le et al. | |
| 2018/0205154 A1 | 7/2018 | Baik et al. | |
| 2019/0097317 A1 | 3/2019 | Di Nallo et al. | |
| 2019/0305435 A1 * | 10/2019 | Robinson | H01Q 1/36 |

FOREIGN PATENT DOCUMENTS

| | | |
|---|---|---|
| KR | 10-1533232 B1 | 7/2015 |
| WO | 2016112839 A1 | 7/2016 |

OTHER PUBLICATIONS

Venanzoni, et al., MDPI, Applied Sciences [online], <URL: https://doi.org/10.3390/app9051003>, "Review of Substrate Integrated Waveguide Circuits for Beam-Forming Networks Working in X-Band," Mar. 11, 2019, 20 pages.

Extended European Search Report dated Dec. 21, 2021 regarding Application No. 20796294.5, 10 pages.

Paryami et al., "A Wideband, Dual-Polarized, Substrate-Integrated Cavity-Backed Slot Antenna", IEEE Antennas and Wireless Propagation Letters, vol. 9, Jul. 2010, pp. 645-648.

* cited by examiner

ANTENNA SYSTEM HARDWARE PIECE FOR TERAHERTZ (THZ) COMMUNICATION

CROSS-REFERENCE TO RELATED APPLICATION AND CLAIM OF PRIORITY

This application claims priority under 35 U.S.C. § 119(e) to U.S. Provisional Patent Application No. 62/838,368 filed Apr. 25, 2019, the disclosure of which is incorporated herein by reference in its entirety.

TECHNICAL FIELD

The present disclosure relates generally to an antenna structure. More specifically, the present disclosure relates to an antenna structure used for TeraHertz (THz) communication.

BACKGROUND

TeraHertz (THz) communication systems are an emerging technology in beyond 5G networks and 6G networks. THz communications systems utilize operation frequencies above 100 GHz to achieve improved channel capacity usage. At frequencies above 100 GHz, the architecture of THz communications systems encounters significant challenges in order to fulfill power requirements and compensate for relatively high losses and the challenges associated with the implementation at high frequencies (e.g., mmWave and sub-mmWave) hardware. The challenges associated with the hardware are particularly due to using components that are miniaturized or of a reduced size, in particular passive parts such as antenna hardware, power dividers, interconnects, etc., the sizes of which are determined by the operational wavelength.

Much of the hardware does not sufficiently fulfill the power requirements and compensate for the relatively high losses associated with THz communication systems. Much of the hardware that is capable of fulfilling the power requirements and compensates for the relatively high losses requires significant material and manufacturing costs.

SUMMARY

Embodiments of the present disclosure include an antenna and a base station including an antenna.

In one embodiment, an antenna includes a unit cell. The unit cell includes a radiating element, a dielectric substrate, and a feed network. The radiating element includes first and second slots. The dielectric substrate comprises a central cavity filled with a dielectric element. The feed network is proximate to the central cavity and between the dielectric element and the radiating element and comprises first and second horizontal feeds and first and second vertical feeds. The first and second horizontal feeds are separated by an air gap and a first vertical feed to feed a transmission to the first slot. The first and second vertical feeds are connected to the first and second horizontal feeds, respectively, and connected to feed first and second portions of the radiating element, respectively. The first and second portions of the radiating element are adjacent to the first and second slots, respectively.

In another embodiment, a base station includes an antenna including a unit cell. The unit cell includes a radiating element, a dielectric substrate, and a feed network. The radiating element includes first and second slots. The dielectric substrate comprises a central cavity filled with a dielectric element. The feed network is proximate to the central cavity and between the dielectric element and the radiating element and comprises first and second horizontal feeds and first and second vertical feeds. The first and second horizontal feeds are separated by an air gap and a first vertical feed to feed a transmission to the first slot. The first and second vertical feeds are connected to the first and second horizontal feeds, respectively, and connected to feed first and second portions of the radiating element, respectively. The first and second portions of the radiating element are adjacent to the first and second slots, respectively.

In this disclosure, the terms antenna, antenna module, antenna array, beam, and beam steering are frequently used. An antenna module may include one or more arrays. One antenna array may include one or more antenna elements. Each antenna element may be able to provide one or more polarizations, for example vertical polarization, horizontal polarization or both vertical and horizontal polarizations at or around the same time. Vertical and horizontal polarizations at or around the same time can be refracted to an orthogonally polarized antenna. An antenna module radiates the accepted energy in a particular direction with a gain concentration. The radiation of energy in the particular direction is conceptually known as a beam. A beam may be a radiation pattern from one or more antenna elements or one or more antenna arrays.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout the present disclosure. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

FIGS. 1 through 7, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands and sub-6 GHz bands, e.g., 3.5 GHz bands, so as to accomplish higher data rates. To decrease propagation loss of the radio waves and increase the transmission coverage, the beamforming, Massive MIMO, full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 1:
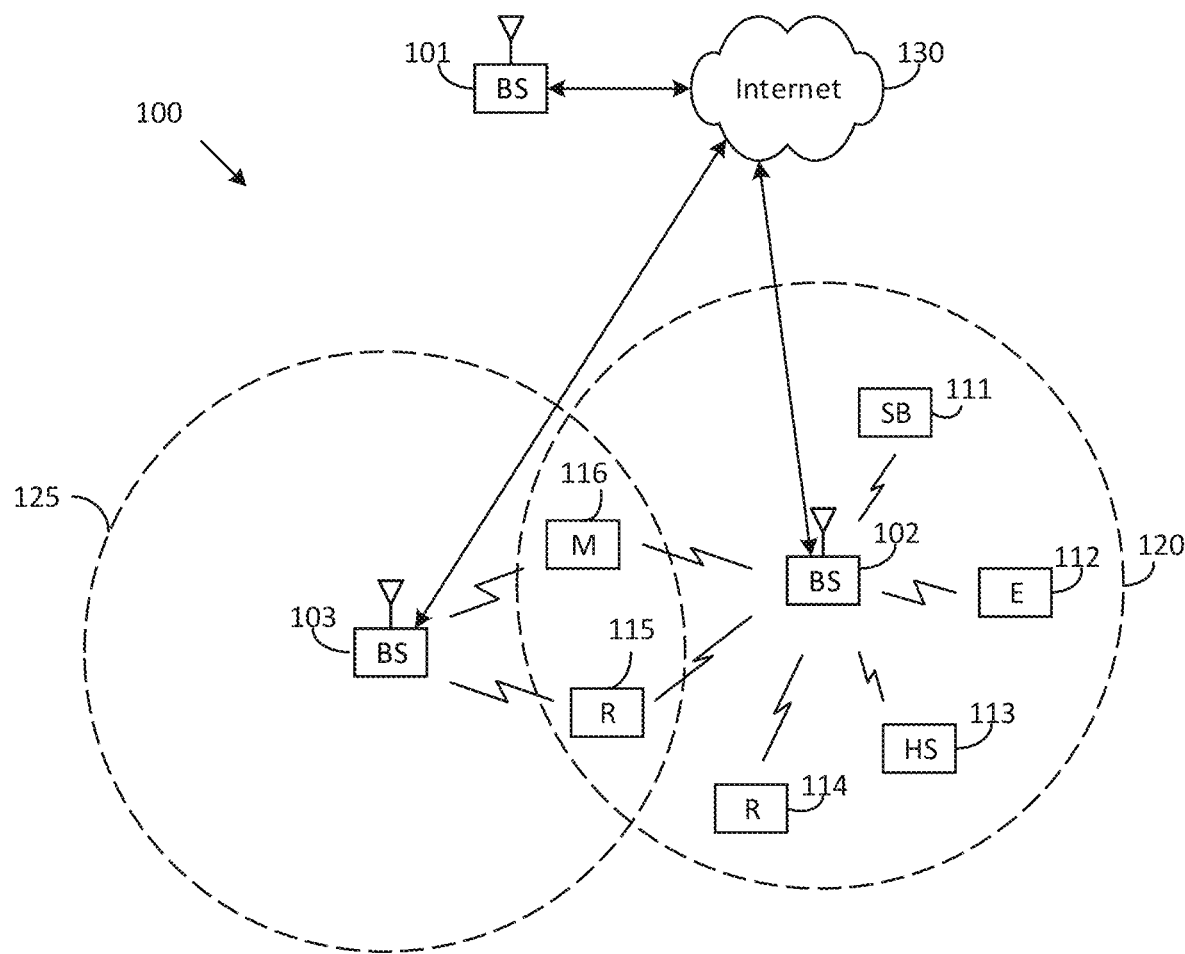
FIG. 1 illustrates a system of a network according to various embodiments of the present disclosure.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or gNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in the present disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the present disclosure to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. The gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
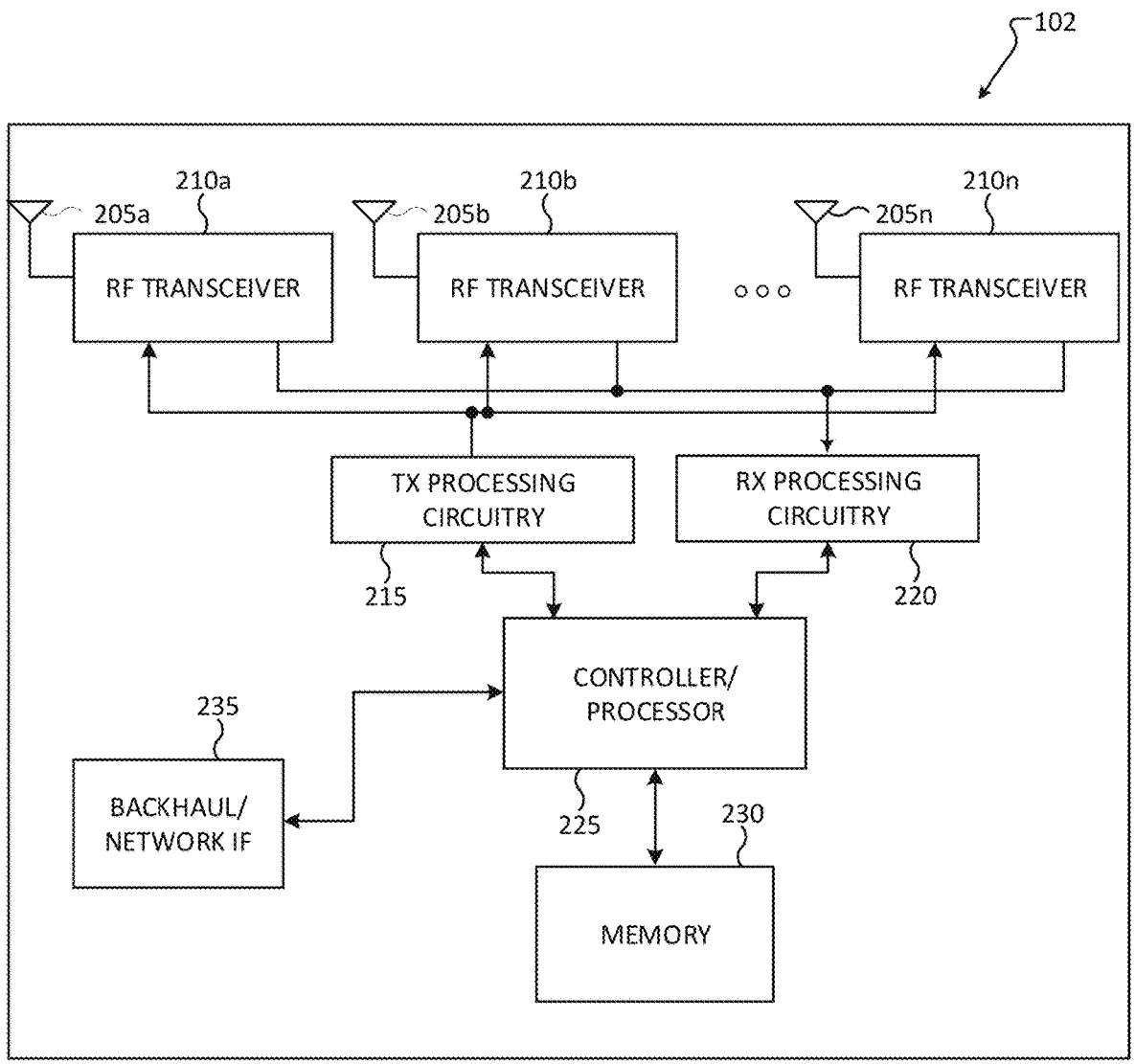
FIG. 2 illustrates a base station according to various embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations and FIG. 2 does not limit the scope of this disclosure to any particular implementation of a gNB.

As shown in FIG. 2, the gNB 102 includes multiple antennas 205a-205n, multiple radiofrequency (RF) transceivers 210a-210n, transmit (TX) processing circuitry 215, and receive (RX) processing circuitry 220. The gNB 102 also includes a controller/processor 225, a memory 230, and a backhaul or network interface 235. In various embodiments, the antennas 205a-205n may be a high gain and large bandwidth antenna that may be designed based on a concept of multiple resonance modes and may incorporate a stacked or multiple patch antenna scheme.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). In addition, various components in FIG. 2 could be combined, further subdivided, or omitted and additional components could be added according to particular needs.

Various embodiments of the present disclosure recognize the challenges associated with the architecture of THz communication systems. In particular, embodiments of the disclosure recognize the difficulty associated with the hardware that is required at high frequencies and sufficient to fulfill the power requirements that compensate for relatively high losses, while staying within the framework necessary for reduced or miniaturized components.

Accordingly, various embodiments of the present disclosure provide structural components that tolerate relatively high overall losses of THz components while maintaining the desired performance. More particularly, various embodiments of the present disclosure provide electromagnetic (EM) structures whose operations are based on an H-field rather than direct coupling with an E-field. In addition, various embodiments of the present disclosure provide EM structures that satisfy system requirements of THz communication systems in beyond 5G networks and 6G networks such as gain, bandwidth, efficiency, and beam-steering. While various embodiments are discussed as being used in connection with THz communication systems, the present disclosure is not limited thereto. For example, various embodiments of the present disclosure may be implemented in any frequency range communication system, including for example, GHz, MHz, 6G, 5G, LTE, 4G, 3G, etc. communication systems.

Figure 3A:
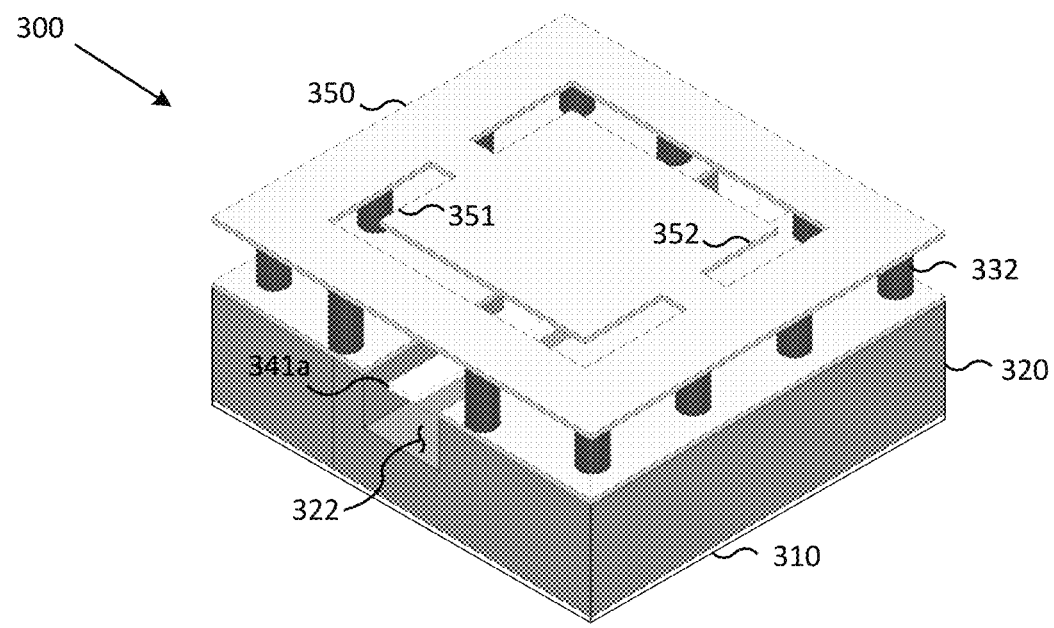
FIGS. 3A-3D illustrate a unit cell according to various embodiments of the present disclosure.
Figure 3B:
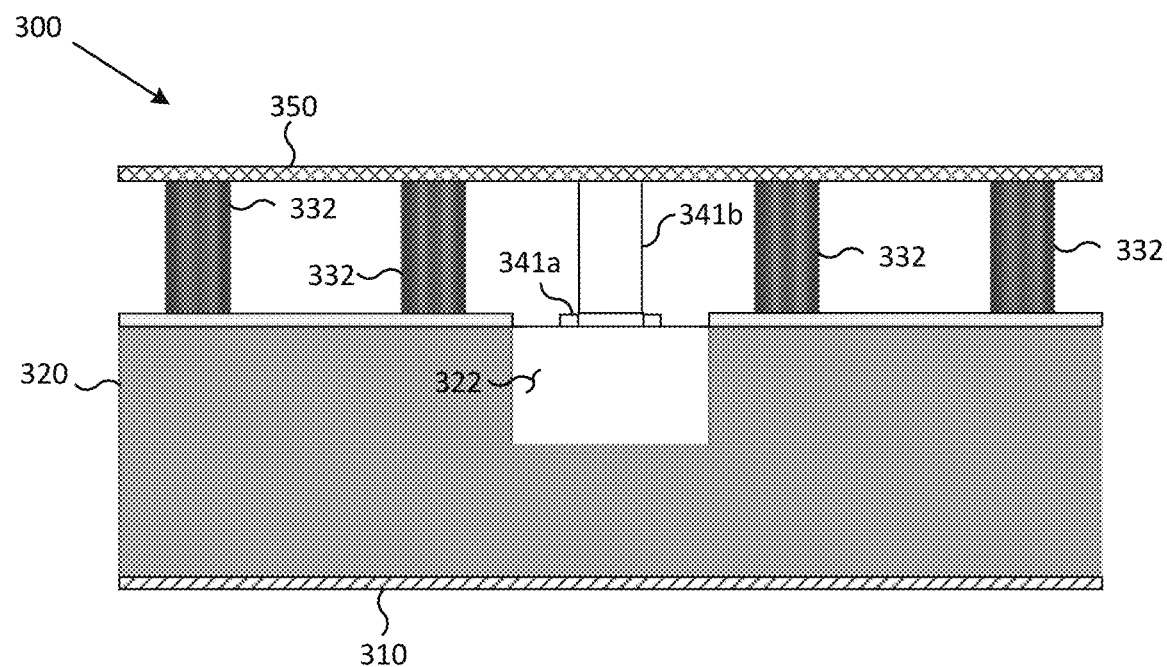
Figure 3C:
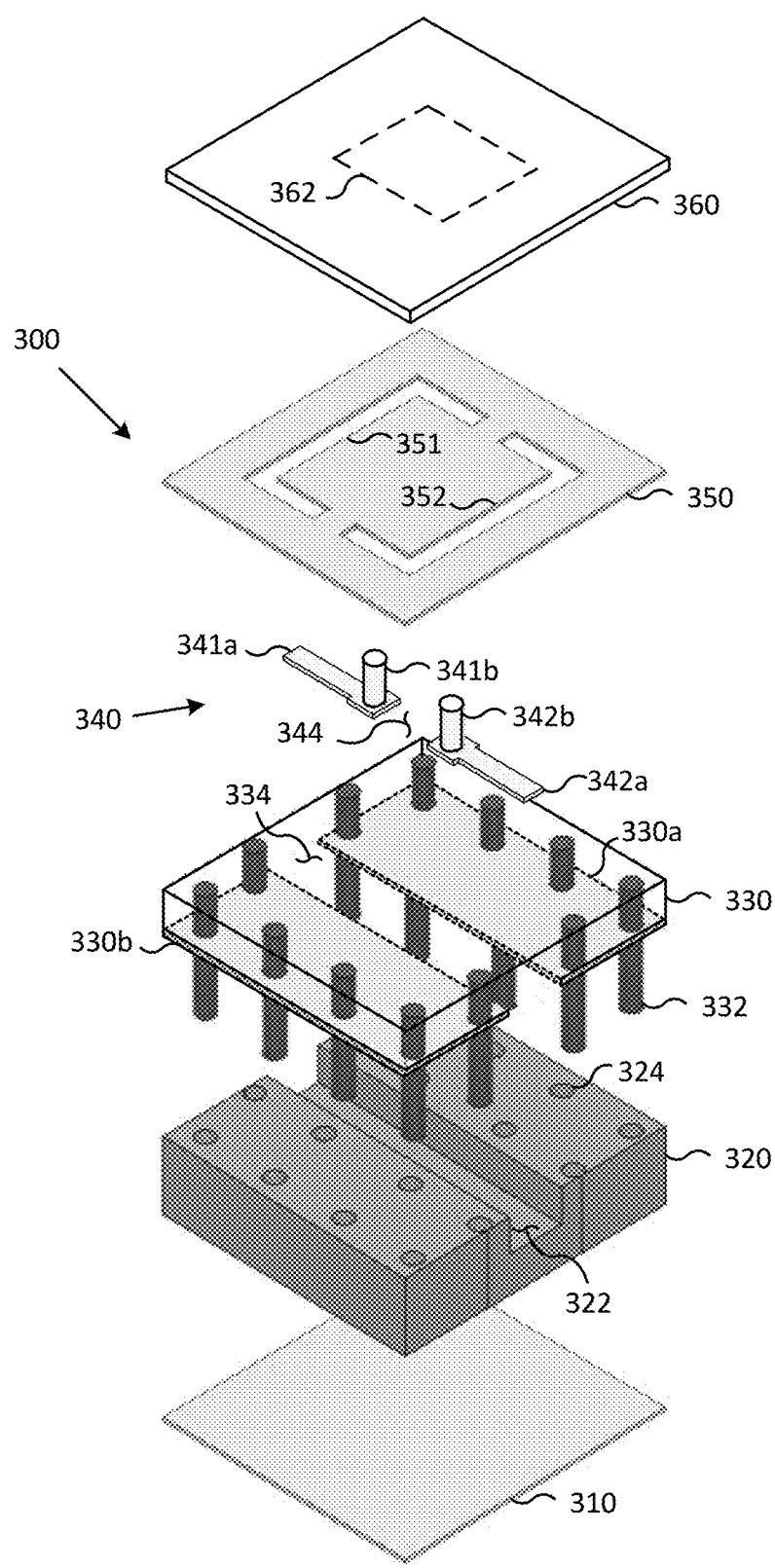

For example, FIGS. 3A-3D illustrate a unit cell according to various embodiments of the present disclosure. FIG. 3A illustrates a top perspective view of the unit cell 300 according to various embodiments of the present disclosure. FIG. 3B illustrates a side view of the unit cell 300 according to various embodiments of the present disclosure. FIG. 3C illustrates an exploded view of the unit cell 300 according to various embodiments of the present disclosure. The unit cell 300 can be implemented in an EM structure that satisfies system requirements of THz communication systems in beyond 5G networks and 6G networks such as gain, bandwidth, efficiency, and beam-steering.

The unit cell 300 includes a lower ground plane 310, a dielectric substrate 320, a waveguide layer 330, a feed network 340, and an upper ground plane 350. The unit cell 300 includes a dual-port structure that can be used for series-fed arrays for both single-ended excitation and differential excitation. The dual-port structure incorporates two slot antennas in a single unit cell 300 and is provided to enable probe-feeding of the two slots that results in increased coupling quality.

The lower ground plane 310 forms the bottom layer of the unit cell 300. The lower ground plane 310 supports various propagation fundamental modes and improves the mechanical stability of the unit cell 300. Throughout the present disclosure, the terms "upper" and "lower" are not to be construed as limiting and are used only to describe the relative layers of the unit cell 300. For example, rotation of the unit cell 300 can result in the lower ground plane 310 being viewed as a top layer of the unit cell 300.

The dielectric substrate 320 is located directly above the lower ground plane 310 and includes a cavity 322. A first side of the dielectric substrate 320 is located directly above the ground plane 310 and a second side of the dielectric substrate 320 includes the cavity 322 and a plurality of vias, or openings, 324. As shown in FIG. 3C, the dielectric substrate 320 includes eight openings 324 on each side of the cavity 322, but various embodiments are possible. For example, the dielectric substrate 320 can include more or fewer than eight openings 324 on each side of the cavity 322.

The cavity 322 is filled with a dielectric element, for example, air. The cavity 322 is provided longitudinally on the second side of the dielectric substrate 320. The cavity 322 is provided to extend from the second side of the dielectric substrate 320 toward the lower ground plane 310. For example, the cavity 322 can have a depth that is between seventy-five percent and ten percent of the total depth of the dielectric substrate 320. The cavity 322 is configured as an air-filled waveguide for phase and loss control of TeraHertz (THz) transmissions through the unit cell 300.

The waveguide layer 330 is disposed, positioned, or located a distance above the dielectric substrate 320. The waveguide layer 330 is a grounded co-planar waveguide that includes a separation gap 334 disposed, positioned, or located between a first plane 330a and a second plane 330b. As shown in FIG. 3C, the gap 334 is provided longitudinally between in the waveguide layer 330 corresponds to the cavity 322. For example, the gap 334 includes a similar width and length as the cavity 322. The gap 334 is configured to accommodate a feed network 340.

The unit cell 300 further includes a plurality of posts 332. Each of the plurality of posts 332 includes a first end inserted into one of the plurality of openings 324, a center portion that extends through an opening in the waveguide layer 330, and a second end that contacts a bottom side of the upper ground plane 350. The plurality of posts 332 are disposed, positioned, or located around a periphery of the unit cell 300 and configured to surround the cavity 322 and control the leakage of transmissions by the feed network 340 by creating a fence that can replicate a metal wall. In various embodiments, the leakage is controlled by reducing leakage, improving isolation, and reducing cross-talk of the feed network 340. Controlling the leakage reduces cross-contamination of multiple unit cells 300 when disposed, positioned, or located in a linear antenna array as described below in the description of FIG. 6A and reduces power flow toward undesirable directions.

Although each of the plurality of posts 332 is described herein as a single post, various embodiments are possible. For example, each of the plurality of posts 332 can include two separate posts 332 where one post is disposed, positioned, or located above the other post. Where each of the plurality of posts 332 including two separate posts 332, the waveguide layer 330 may not include openings for the posts 332. The lower post 332 can be inserted into one of the plurality of openings 324 and the upper post 332 can be disposed, positioned, or located on top of the waveguide layer 330 and contact the bottom side of the upper ground plane 350.

The upper ground plane 350 is disposed, positioned, or located a distance above the waveguide layer 330 and includes a first U-shaped slot 351 and a second U-shaped slot 352. The distance between the upper ground plane 350 and the waveguide layer 330 is determined by the length of the plurality of posts 332. More particularly, the distance between the upper ground plane 350 and the waveguide layer 330 is determined by an amount of the plurality of posts 332 that extends above the waveguide layer 330. Each of the first U-shaped slot 351 and the second U-shaped slot 352 are openings in the upper ground plane 350. More particularly, the first U-shaped slot 351 and the second U-shaped slot 352 can be described as an absence of material in the upper ground plane 350. In other embodiments, one or both of the first U-shaped slot 351 and the second U-shaped slot 352 can be filled with a dielectric material, for example, air. In combination, the first U-shaped slot 351 and the second U-shaped slot 352 form an array of two elements that increases a unit gap by approximately 3 dB.

Figure 3D:
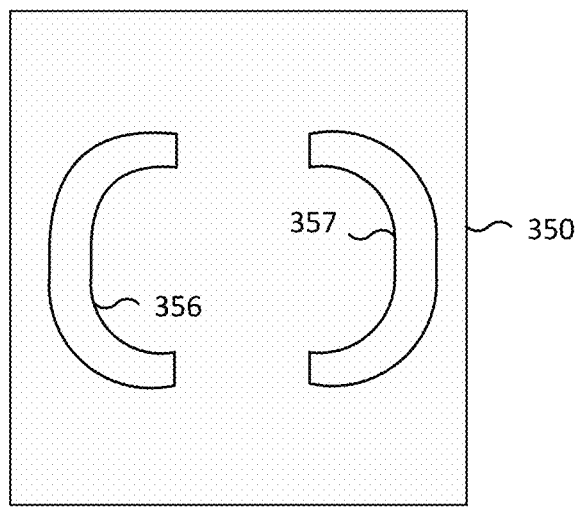

As shown in FIGS. 3A-3C, the first U-shaped slot 351 and the second U-shaped slot 352 can be formed in a squared-off shape. In other words, the corners of each of the first U-shaped slot 351 and the second U-shaped slot 352 can be formed at approximately a ninety-degree angle. Although shown in FIGS. 3A-3C in a squared-off shape, this embodiment should not be construed as limiting and various embodiments are possible. For example, as shown in FIG. 3D, the upper ground plane 350 can include a first U-shaped slot 356 and a second U-shaped slot 357 in a rounded shape. In other embodiments, one of the first U-shaped slot and the second U-shaped slot can be provided in a squared-off shape and the other of the first U-shaped slot and the second U-shaped slot can be provided in a rounded shape.

The feed network 340 of the unit cell 300 includes a first horizontal feed 341a, a first vertical feed 341b, a second horizontal feed 342a, and a second vertical feed 342b. The first horizontal feed 341a extends from an edge of the unit cell 300 toward the center of the unit cell 300. At or near a termination of the first horizontal feed 341a, the first vertical feed 341b is provided. The first vertical feed 341b extends from the first horizontal feed 341a away from the waveguide layer 330 toward the upper ground plane 350. Likewise, the second horizontal feed 342a extends from an edge of the unit cell 300 toward the center of the unit cell 300. At or near a termination of the second horizontal feed 342a, the second vertical feed 342b is provided. The second vertical feed 342b extends from the second horizontal feed 342a away from the waveguide layer 330 toward the upper ground plane 350. The first horizontal feed 341a and the first vertical feed 341b can be described as asymmetrical striplines. The second horizontal feed 342a and the second vertical feed 342b can be described as asymmetrical striplines. The first horizontal feed 341a and the second horizontal feed 342a can be described as symmetrical striplines. The first vertical feed 341b and the second vertical feed 342b can be described as symmetrical striplines.

An air gap 344 is provided between the termination point of the first horizontal feed 341a and the second horizontal feed 342a and, accordingly, between the first vertical feed 341b and the second vertical feed 342b. Each of the first horizontal feed 341a and the second horizontal feed 342a are interconnect inner conductors that utilize a stripline feeding mechanism. In various embodiments, each of the first horizontal feed 341a and the second horizontal feed 342a can be stitched to control the parallel plate to reduce transmission loss. In various embodiments, each of the first horizontal feed 341a and the second horizontal feed 342a can be buried transmission lines within the unit cell 300.

The first horizontal feed 341a can receive a transmission and carry the transmission to the first vertical feed 341b. A vertical transition from the first vertical feed 341b to the first U-shaped slot 351 carries the transmission to the first U-shaped slot 351. The transmission can then transition to the second U-shaped slot 352 and change phase between the first U-shaped slot 351 and the second U-shaped slot 352. A vertical transition from the second U-shaped slot 352 to the second vertical feed 342b carries the transmission away from the second U-shaped slot 352. The transmission can then be carried along the second vertical feed 342b to the second horizontal feed 342a.

Similarly, the second horizontal feed 342a can receive a transmission and carry the transmission to the second vertical feed 342b. A vertical transition from the second vertical feed 342b to the second U-shaped slot 352 carries the transmission to the second U-shaped slot 352. The transmission can then transition to the first U-shaped slot 351 and change phase between the second U-shaped slot 352 and the first U-shaped slot 351. A vertical transition from the first U-shaped slot 351 to the first vertical feed 341b carries the transmission away from the first U-shaped slot 351. The transmission can then be carried along the first vertical feed 341b to the first horizontal feed 341a.

As described herein, the distribution of the first U-shaped slot 351 and the second U-shaped slot 352 in the unit cell 300 establishes a mechanism for a one hundred-eighty degree phase shift. The one hundred-eighty degree phase shift allows the first U-shaped slot 351 and the second U-shaped slot 352 radiate in-phase and increase the unit gap by approximately three dB.

In some embodiments, the unit cell 300 can include an electromagnetic (EM) layer 360 situated above the upper ground plane 350. The EM layer 360 can include a radiation patch 362 comprising a dielectric material such that EM radiation can pass through the dielectric material. In various embodiments, the radiation patch 362 can be provided in any suitable shape such as a circular patch, a quadrilateral patch, or any other shape that allows sufficient radiation.

FIG. 3D illustrates a top view of an alternative embodiment of the upper ground plane 350. As shown in FIG. 3D, the upper ground plane 350 includes a first U-shaped slot 356 and a second U-shaped slot 357. The first U-shaped slot 356 and the second U-shaped slot 357 include at least some edges that are not measured at approximately ninety degrees. In various embodiments, the first U-shaped slot 356 and the second U-shaped slot 357 can be provided in an arch shape, a semi-circle shape, an arc shape, or any other suitable shape that does not include each edge provided in a squared off shape.

Figure 4A:
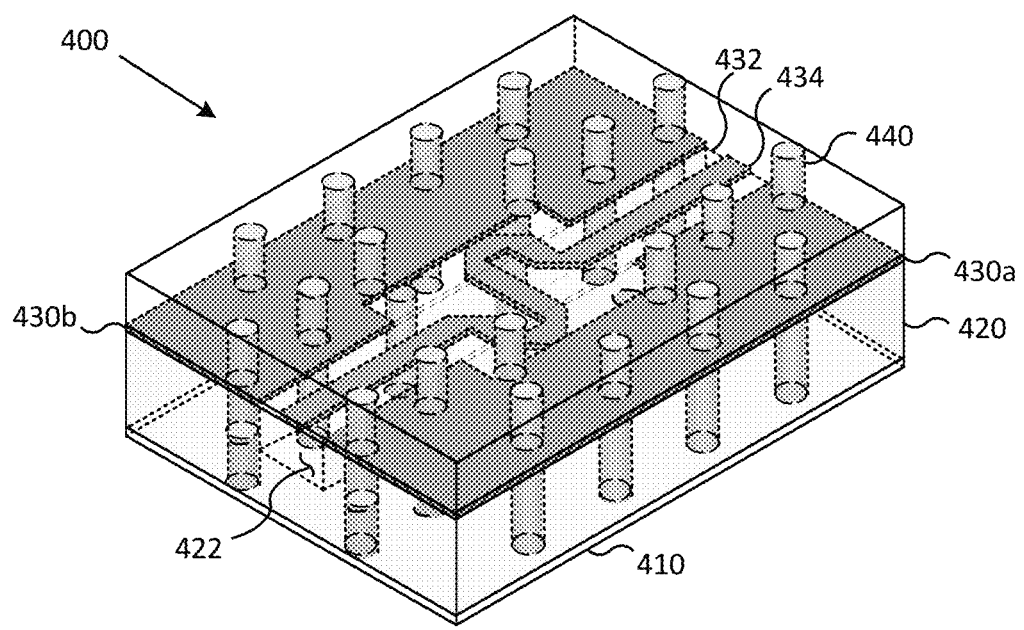
FIGS. 4A-4C illustrate an interconnect phasing cell according to various embodiments of the present disclosure.
Figure 4B:
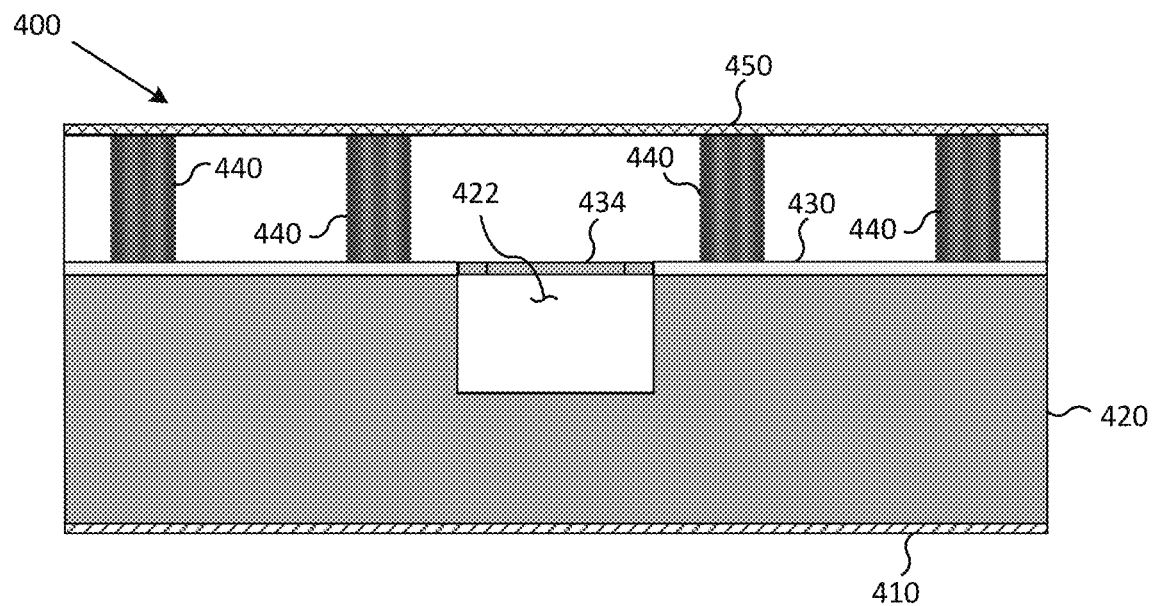
Figure 4C:
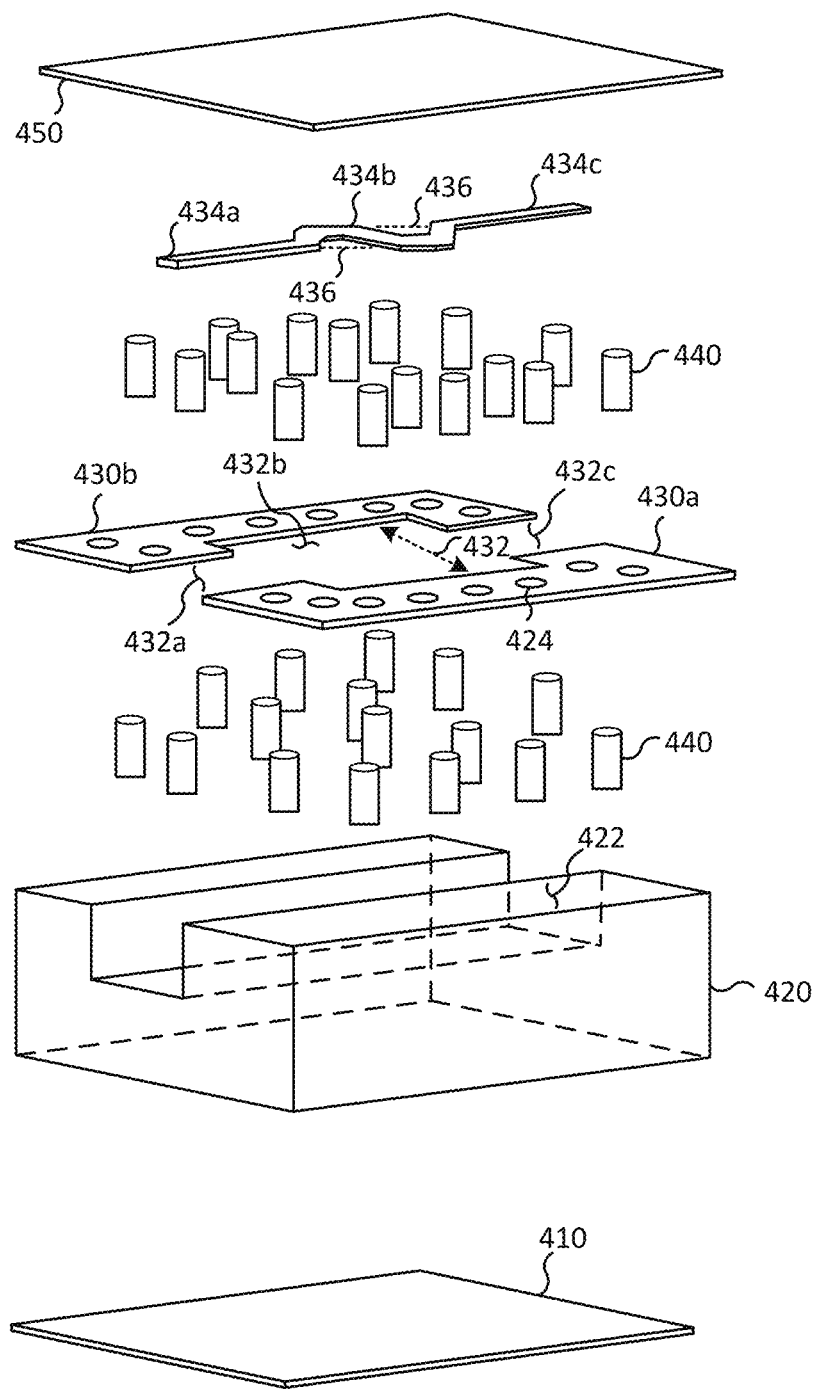

FIGS. 4A-4C illustrate an interconnect phasing cell according to various embodiments of the present disclosure. FIG. 4A illustrates a top perspective view of the interconnect phasing cell 400 according to various embodiments of the present disclosure. FIG. 4B illustrates a side view of the interconnect phasing cell 400 according to various embodiments of the present disclosure. FIG. 4C illustrates an exploded view of the interconnect phasing cell 400 according to various embodiments of the present disclosure. The interconnect phasing cell 400 can be implemented in an EM structure, which can also include the unit cell 300, that satisfies system requirements of THz communication systems in beyond 5G networks and 6G networks such as gain, bandwidth, efficiency, and beam-steering.

The interconnect phasing cell 400 includes a lower ground plane 410, a dielectric layer 420, an elevated ground plane 430, and a horizontal transmission line 434. In various embodiments, the interconnect phasing cell 400 can be provided in an antenna array that includes the unit cell 300 to establish inter-element connectivity and control a desired phasing setting of the antenna array. For example, the interconnect phasing cell 400 can adjust the phasing element of an antenna array that also includes one or more unit cells 300. By adjusting the physical parameters of the phasing element, the direction of the radiated beam from the THz array can be controlled. The antenna array including each of the unit cell 300 and the interconnect phasing cell 400 will be described in greater detail in the description of FIGS. 6 and 7 below.

The lower ground plane 410 forms the bottom layer of the interconnect phasing cell 400. The lower ground plane 410 supports various propagation fundamental modes and improves the mechanical stability of the interconnect phasing cell 400. Throughout the present disclosure, the term "lower" is not to be construed as limiting and is used only to describe the relative layers of the interconnect phasing cell 400. For example, rotation of the interconnect phasing cell 400 can result in the lower ground plane 410 being viewed as a top layer of the interconnect phasing cell 400.

The dielectric layer 420 includes a dielectric substrate. The dielectric layer 420 is disposed, positioned, or located directly above the lower ground plane 410 and includes a cavity 422. A first side of the dielectric layer 420 is located directly above the lower ground plane 410 and a second side of the dielectric layer 420 includes the cavity 422 and a plurality of vias, or openings, 424. As shown in FIG. 4C, the dielectric layer 420 includes nine openings 424 on each side of the cavity 422, but various embodiments are possible. For example, the dielectric layer 420 can include more or fewer than nine openings 424 on each side of the cavity 422.

The cavity 422 can be filled with a dielectric element, for example, air. The cavity 422 is provided longitudinally on the second side of the dielectric layer 420. The cavity 422 is provided to extend from the second side of the dielectric layer 420 toward the lower ground plane 410. For example, the cavity 422 can have a depth that is between seventy-five percent and ten percent of the total depth of the dielectric layer 420. The cavity 422 is configured as an air-filled waveguide to improve insertion loss and propagation delay.

The elevated ground plane 430 is above the dielectric layer 420. For example, the elevated ground plane 430 can be adjacent to the second side of the dielectric layer 420. The elevated ground plane 430 includes a separation gap 432 between a first plane 430a and a second plane 430b of the elevated ground plane 430. The separation gap 432 includes a first portion 432a, a second portion 432b, and a third portion 432c. The first portion 432a and the third portion 432c include a width that is the same or substantially the same. For example, the first portion 432a and the third portion 432c can have a width that is identical. The second portion 432b is between the first portion 432a and the third portion 432c and includes a width that is greater than the width of each of the first portion 432a and the third portion 432c. Accordingly, a central portion of each of the first plane 430a and second plane 430b, which correspond to the second portion 432b of the separation gap 432, includes a width that is less than the widths of the portions that correspond to each of the first portion 432a and the third portion 432c.

The horizontal transmission line 434 is in the separation gap 432 between the first plane 430a and the second plane 430b. The horizontal transmission line 434 is an interconnect inner conductor that utilizes a stripline feeding mechanism. In various embodiments, the horizontal transmission line 434 can be stitched to control the parallel plate to reduce transmission loss. In various embodiments, the horizontal transmission line 434 can be a buried transmission line within the interconnect phasing cell 400.

The horizontal transmission line 434 includes a first portion 434a, a second portion 434b, and a third portion 434c. Each of the first portion 434a and the third portion 434c are substantially straight and configured to transmit a feed to one of the unit cell 300 described in FIGS. 3A-3D or the THz transition/matching circuit cell 500 described below in FIGS. 5A-5C. In particular, each of the first portion 434a and the third portion 434c are to correspond to the first horizontal feed 341a, the second horizontal feed 342a, or the first transmission line 534. In various embodiments, power can be transferred from the first horizontal feed 341a of a first unit cell 300 to the horizontal feed 434 to the second horizontal feed 342a of a second unit cell 300.

The second portion 434b is a curved portion of the horizontal transmission line 434 to adjust a coupling phase of a transmission by the unit cell 300. In various embodiments, the curve in the second portion 434b can be meandering, winding, twisting, turning, zigzagging, or of any other suitable curvature. The second portion 434b is in the second portion 432b of the elevated ground plane 430. For example, the second portion 432b of the elevated ground plane 430 can be provided to create an area for the second portion 434b to meander as described herein. The meandering structure of the second portion 434b increases the surface area of the horizontal transmission line 434 within the interconnect phasing cell 400 and creates a plurality of spaces 436 provided between the meandering portions of the second portion 434b. Capacitance is created in the spaces 436 between the meandering portions of the second portion 434b.

The interconnect phasing cell 400 further includes a plurality of posts 440. Each of the plurality of posts 440 includes a first end inserted into one of the plurality of openings 424, a center portion that extends through an opening in the elevated ground plane 430, and a second end that extends above the elevated ground plane 430. The plurality of posts 440 are configured to surround the cavity 422 and control the leakage of transmissions by the horizontal transmission line 434 by creating a fence that replicates a metal wall. In various embodiments, the leakage is controlled by reducing leakage, improving isolation, and reducing cross-talk of the horizontal transmission line 434. This reduces cross-contamination of multiple interconnect phasing cells 400 when in a linear antenna array as described below in the description of FIG. 6A and reduces power flow toward undesirable directions.

Although each of the plurality of posts 440 is described herein as a single post, various embodiments are possible. For example, each of the plurality of posts 440 can include two separate posts 440 where one post is above the other post. In this embodiment, the elevated ground plane 430 may not include openings for the posts 440. The lower post 440 can be inserted into one of the plurality of openings 424 and the upper post 440 can be on top of the elevated ground plane 430.

In some embodiments, the interconnect phasing cell 400 can include an electromagnetic (EM) layer 450 situated above the elevated ground plane 430. The EM layer 450 can be analogous to the EM layer 360 of the unit cell 300.

In some embodiments, various features of the interconnect phasing cell 400 can be provided to correspond to features of the unit cell 300. For example, the lower ground plane 410 can correspond to the lower ground plane 310. In some embodiments, an antenna array can include a single lower ground plane layer to provide mechanical stability of the antenna array and the single ground plane layer can include the lower ground plane 410 and the lower ground plane 310. The dielectric layer 420 can correspond to the dielectric substrate 320. The cavity 422 can correspond to the cavity 322. In some embodiments, an antenna array can include a single dielectric layer that includes the dielectric layer 420 and the dielectric substrate 320 and a single cavity that includes the cavity 422 and the cavity 322.

Although the horizontal transmission line 434 is described herein as corresponding to at least one of the first horizontal feed 341a, the second horizontal feed 342a, or a first transmission line 534, various embodiments are possible. In some embodiments, the horizontal transmission line 434 can be an extension of one or more of the first horizontal feed 341a, the second horizontal feed 342a, or the first transmission line 534. For example, a second horizontal feed 342a of a first unit cell 300 can extend into an interconnect phasing cell 400 as a horizontal transmission line 434, which then extends into a second unit cell 300 as a first horizontal feed 341a. As another example, a second horizontal feed 342a of a first unit cell 300 can extend into an interconnect phasing cell 400 as a horizontal transmission line 434, which then extends into a THz transition/matching circuit cell 500 as a first transmission line 534.

Figure 5A:
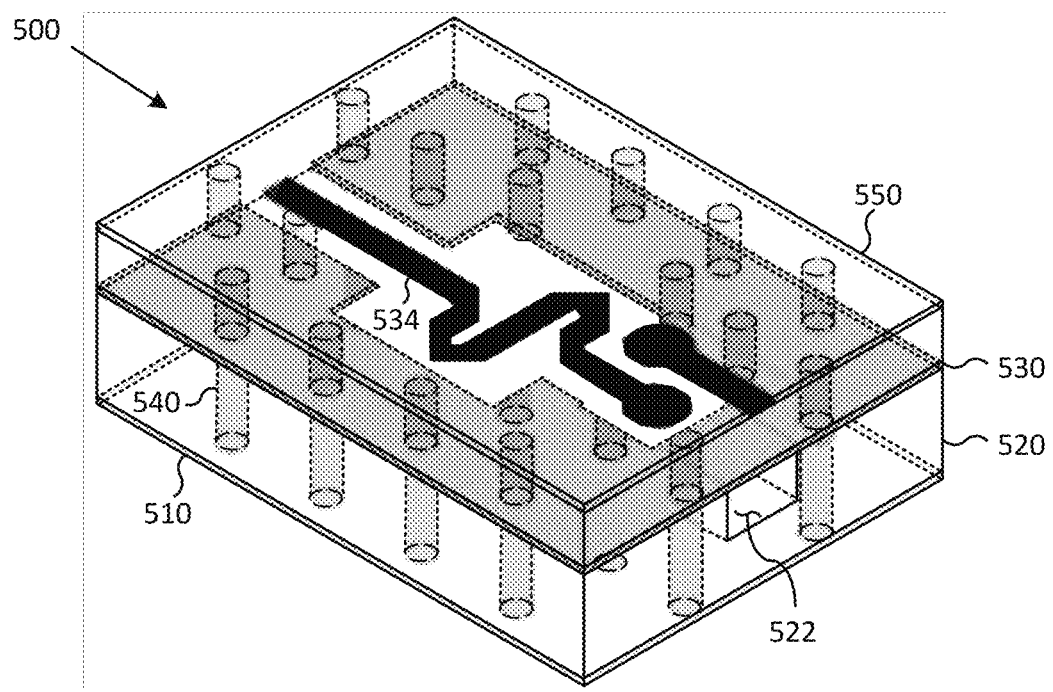
FIGS. 5A-5C illustrate a transition/matching circuit cell according to various embodiments of the present disclosure.
Figure 5B:
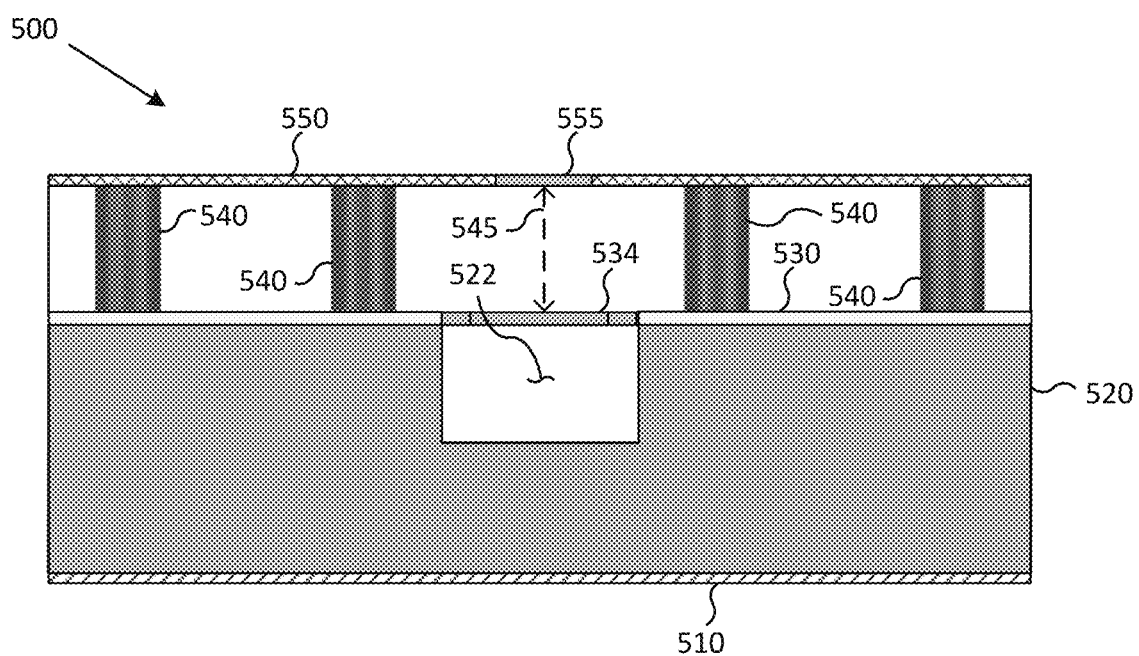
Figure 5C:
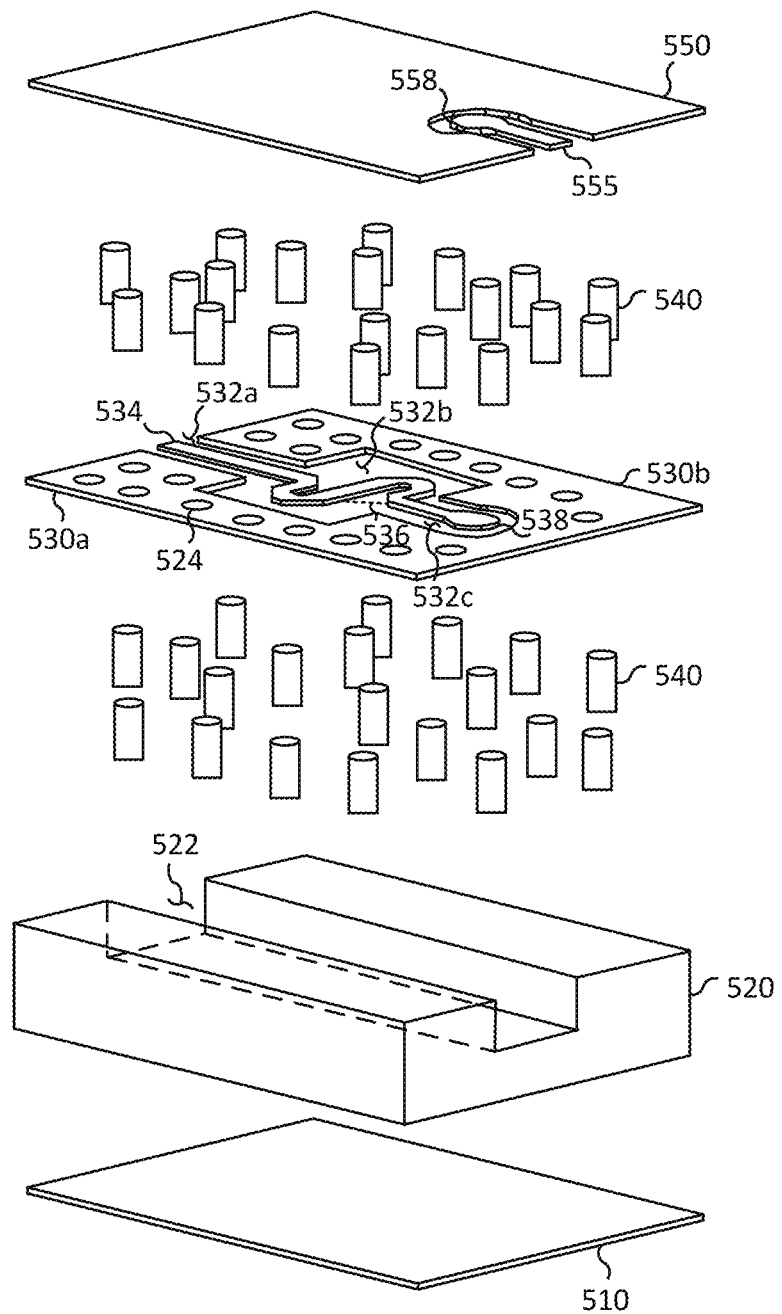

FIGS. 5A-5C illustrate a THz transition/matching circuit cell according to various embodiments of the present disclosure. FIG. 5A illustrates a top perspective view of the transition/matching circuit cell 500 according to various embodiments of the present disclosure. FIG. 5B illustrates a side view of the transition/matching circuit cell 500 according to various embodiments of the present disclosure. FIG. 5C illustrates an exploded view of the transition/matching circuit cell 500 according to various embodiments of the present disclosure. The transmission/matching circuit cell 500 can be implemented in an EM structure, which also includes one or both of the unit cell 300 and the interconnect phasing cell 400, that satisfies system requirements of THz communication systems in beyond 5G networks and 6G networks such as gain, bandwidth, efficiency, and beam-steering.

The transition/matching circuit cell 500 includes a lower ground plane 510, a dielectric layer 520, an elevated ground plane 530, and an upper ground plane layer 550. By adjusting the physical parameters of the phasing element, the direction of the radiated beam from the THz array can be controlled. The antenna array including at least one unit cell 300, interconnect phasing cell 400, and transition/matching circuit cell 500 will be described in greater detail in the description of FIGS. 6 and 7 below.

The lower ground plane 510 forms the bottom layer of the transition/matching circuit cell 500. The lower ground plane 510 supports various propagation fundamental modes and improves the mechanical stability of the transition/matching circuit cell 500. Throughout the present disclosure, the term "lower" is not to be construed as limiting and is used only to describe the relative layers of the transition/matching circuit cell 500. For example, rotation of the transition/matching circuit cell 500 can result in the lower ground plane 510 being viewed as a top layer of the transition/matching circuit cell 500.

The dielectric layer 520 includes a dielectric substrate. The dielectric layer 520 is disposed, positioned, or located directly above the lower ground plane 510 and includes a cavity 522. A first side of the dielectric layer 520 is located directly above the lower ground plane 510 and a second side of the dielectric layer 520 includes the cavity 522 and a plurality of vias, or openings, 524. As shown in FIG. 5C, the dielectric layer 520 includes nine openings 524 on each side of the cavity 522, but various embodiments are possible. For example, the dielectric layer 520 can include more or fewer than nine openings 524 on each side of the cavity 522.

The cavity 522 can be filled with a dielectric element, for example, air. The cavity 522 is provided longitudinally on the second side of the dielectric layer 520. The cavity 522 is provided to extend from the second side of the dielectric layer 520 toward the lower ground plane 510. For example, the cavity 522 can have a depth that is between seventy-five percent and ten percent of the total depth of the dielectric layer 520. The cavity 522 is configured as an air-filled waveguide to improve insertion loss and propagation delay.

The elevated ground plane 530 is above the dielectric layer 520. For example, the elevated ground plane 530 can be adjacent to the second side of the dielectric layer 520. The elevated ground plane 530 includes a separation gap 532 between a first side 530a and a second side 530b of the elevated ground plane 530. The separation gap 532 includes a first portion 532a, a second portion 532b, and a third portion 532c. The first portion 532a and the third portion 532c include a width that is the same or substantially the same. The second portion 532b is between the first portion 532a and the third portion 532c and includes a width that is greater than the width of each of the first portion 532a and the third portion 532c. Accordingly, a central portion of each of the first side 530a and second side 530b, which correspond to the second portion 532b of the separation gap 532, includes a width that is less than the widths of the portions that correspond to each of the first portion 532a and the third portion 532c.

The elevated ground plane 530 includes a first transmission line 534 disposed, positioned, or located in the separation gap 532 between the first side 530a and the second side 530b. The first transmission line 534 is an interconnect inner conductor that utilizes a stripline feeding mechanism. In various embodiments, the first transmission line 534 can be stitched to control the parallel plate to reduce transmission loss. In various embodiments, the first transmission line 534 can be a buried transmission line within the transition/matching circuit cell 500.

The first transmission line 534 includes a first portion 534a, a second portion 534b, a third portion 534c, and a termination portion 534d. Each of the first portion 534a and the third portion 534c are substantially straight. The first portion 534a is configured to transmit or receive a feed from the interconnect phasing cell 400. In particular, the first portion 534a is configured to correspond to the horizontal transmission line 434 in the interconnect phasing cell 400. In various embodiments, power can be transferred to or from the horizontal transmission line 434 by the first transmission line 534.

The second portion 534b is a curved portion of the first transmission line 534 to adjust a coupling phase of a transmission by the unit cell 300. In various embodiments, the curve in the second portion 534b can be meandering, winding, twisting, turning, zigzagging, or of any other suitable curvature. The second portion 534b is in the second portion 532b of the elevated ground plane 530. For example, the second portion 532b of the elevated ground plane 530 can be provided to create an area for the second portion 534b to meander as described herein. The meandering structure of the second portion 534b increases the surface area of the first transmission line 534 within the transition/matching circuit cell 500 and creates a plurality of spaces 536 provided between the meandering portions of the second portion 534b. Capacitance is created in the spaces 536 between the meandering portions of the second portion 534b.

The third portion 534c includes a vertical port 538 at a termination point of the third portion 534c. In some embodiments, the vertical port 538 corresponds to a vertical port 558 of an inner conductor 555 described herein.

The transition/matching circuit cell 500 further includes a plurality of posts 540. Each of the plurality of posts 540 includes a first end inserted into one of the plurality of openings 524, a center portion that extends through an opening in the elevated ground plane 530, and a second end that extends above the elevated ground plane 530. The plurality of posts 540 are configured to surround the cavity 522 and control the leakage of transmissions by the horizontal transmission line 534 by creating a fence that replicates a metal wall. In various embodiments, the leakage is controlled by reducing leakage, improving isolation, and reducing cross-talk of the horizontal transmission line 534. This reduces cross-contamination of multiple transition/matching circuit cells 500 when disposed, positioned, or located in a linear antenna array as described below in the description of FIG. 6A and reduces power flow toward undesirable directions.

Although each of the plurality of posts 540 is described herein as a single post, various embodiments are possible. For example, each of the plurality of posts 540 can include two separate posts 540 where one post is above the other post. In this embodiment, the elevated ground plane 530 may not include openings for the posts 540. The lower post 540 can be inserted into one of the plurality of openings 524 and the upper post 540 can be on top of the elevated ground plane 530.

The upper ground plane layer 550 is above the elevated ground plane 530 and the plurality of posts 540. In some embodiments, the second end of each of the plurality of posts 540 that extends above the elevated ground plane 530 contacts an underside of the upper ground plane layer 550. The upper ground plane 550 is provided to facilitate incorporation of an inner conductor 555 of a grounded co-planar wave (GCPW) guide layer of an adjoining cell into the transition/matching circuit cell 500. The inner conductor 555 is within the grounded co-planar wave (GCPW) guide layer of the adjoining cell and extends into the upper ground plane layer 550 as shown in FIGS. 5A-5C. The inner conductor 555 terminates, within the transition/matching circuit cell 500, in a vertical port 558 that corresponds to the vertical port 538 of the horizontal transmission line 534.

The transition/matching circuit cell 500 includes an air gap 545 between the elevated ground plane 530 and the upper ground plane layer 550. More specifically, the air gap 545 is provided between the vertical port 558 of the inner conductor 555 and the vertical port 538 of the horizontal transmission line 534. The air gap 545 provides a mechanism for induction between the vertical port 558 of the inner conductor 555 and the vertical port 538 of the horizontal transmission line 534. In various embodiments, the induction between the vertical port 558 and the vertical port 538 can be canceled by the capacitance between the spaces 536 in the meandering portion of the second portion 534b.

In some embodiments, various features of the transition/matching circuit cell 500 can be provided to correspond to features of the interconnect phasing cell 400. For example, the lower ground plane 510 can correspond to the lower ground plane 410. In some embodiments, an antenna array can include a single lower ground plane layer to provide mechanical stability of the antenna array and the single ground plane layer can include the lower ground plane 510 and the lower ground plane 410. The dielectric layer 520 can correspond to the dielectric substrate 420. The cavity 522 can correspond to the cavity 422.

When arranged in series, such as in a linear antenna array, the unit cell 300, interconnect phasing cell 400, and THz transition/matching circuit cell 500 can tolerate relatively high overall losses of THz components while maintaining a desired performance of the antenna. In particular, the antenna array is an EM structure whose operations are based on an H-field rather than direct coupling with an E-field and satisfy system requirements of THz communication systems in beyond 5G networks and 6G networks such as gain, bandwidth, efficiency, and beam-steering.

Figure 6A:
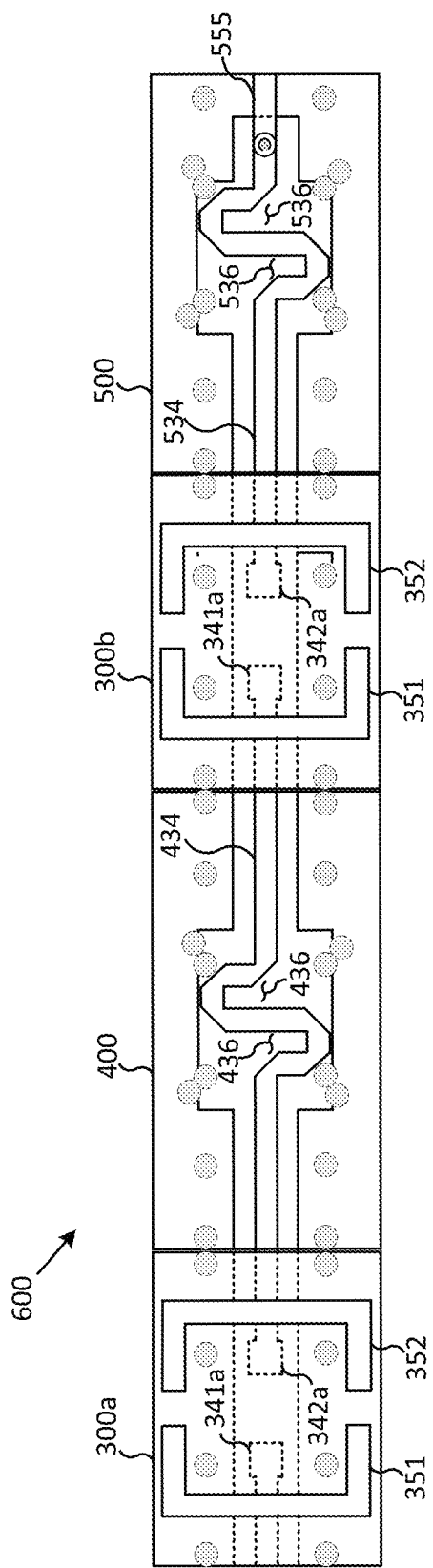
FIGS. 6A and 6B illustrate a linear antenna array according to various embodiments of the present disclosure.
Figure 6B:
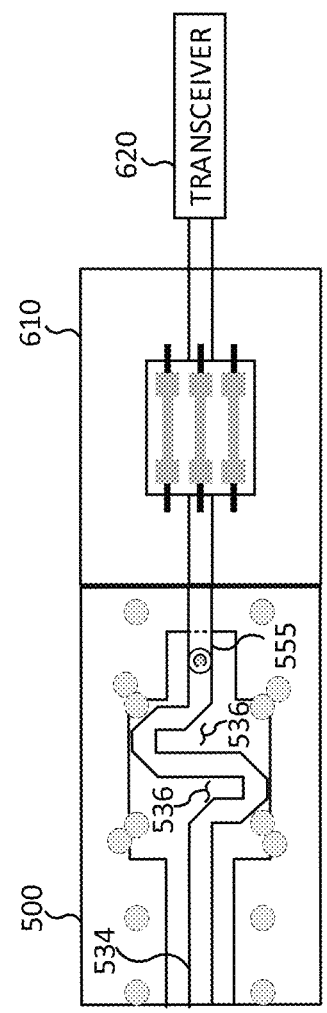

For example, FIGS. 6A and 6B illustrate a linear antenna array according to various embodiments of the present disclosure. FIG. 6A illustrates a linear antenna array 600 that includes an interconnect phasing cell 400 coupled to a unit cell 300a and a unit cell 300b. The unit cell 300b is coupled to a THz transition/matching circuit cell 500. Each of the unit cells 300a, 300b can be the unit cell 300 described in the description of FIGS. 3A-3D. The interconnect phasing cell 400 can be the interconnect phasing cell 400 described in the description of FIGS. 4A-4C. The transition/matching circuit cell 500 can be the transition/matching circuit cell 500 described in the description of FIGS. 5A-5C. The linear antenna array 600 can be implemented in an EM structure that satisfies system requirements of THz communication systems in beyond 5G networks and 6G networks such as gain, bandwidth, efficiency, and beam-steering.

The linear antenna array 600 includes an example configuration of the unit cells 300, interconnect phasing cell 400, and the THz transition/matching circuit cell 500. Although illustrated in FIG. 6A as including two unit cell 300s, one interconnect phasing cell 400, and one THz transition/matching circuit cell 500, various embodiments are possible. For example, a linear antenna array 600 can include any suitable number of alternating unit cells 300 and interconnect phasing cells 400. In other embodiments, multiple interconnect phasing cells 400 can be coupled together without a unit cell 300 disposed, positioned, or located in between the interconnect phasing cells 400.

The arrangement of the linear antenna array 600 illustrated in FIG. 6A facilitates an interconnected stripline feed network between unit cells 300, at least one interconnect phasing cell 400, and a THz transition/matching circuit cell 500. For example, as shown in FIG. 6A, the second horizontal feed 342 of the first unit cell 300a is coupled to a first end of the horizontal transmission feed 434 of the interconnect phasing cell 400. Similarly, a second end of the horizontal transmission feed 434 of the interconnect phasing cell 400 is coupled to the first horizontal feed 341 of the second unit cell 300b. The second horizontal feed 342 of the second unit cell 300b is coupled to the transmission line 534 of the THz transition/matching circuit cell 500.

As shown in FIG. 6A, a transmission can be carried through the linear antenna array 600 by the stripline feed network. For example, a transmission can be originated or received at the THz transition/matching circuit cell 500. The transmission can be transmitted by the inner conductor 555 and, by induction, be carried from the vertical port 558 to the vertical port 538. The transmission can be received by the vertical port 538 and carried through the THz transition/matching circuit cell 500 along the first transmission line 534. As the transmission is carried through the meandering portion 534b, capacitance is created by the spaces 536 in the first transmission line 534. The first transmission line 534 is coupled to the second horizontal feed 342 of the second unit cell 300b. The transmission is carried to the second U-shaped slot 352 from the second horizontal feed 342a by induction and then transitions to the first U-shaped slot 351. In some embodiments, the phase of the transmission can change as the transmission transitions from the second U-shaped slot 352 to the first U-shaped slot 351. From the first U-shaped slot 351, the transmission is carried to the first horizontal feed 341a by induction. The transmission is then carried to the horizontal feed 434 of the interconnect phasing cell 400. As the transmission is carried through the meandering portion 434b, capacitance is created by the spaces 436 in the horizontal feed 434. The horizontal feed 434 is coupled to the second horizontal feed 342a of the first unit cell 300a. Each instance of induction from the second horizontal feed 342a to the second U-shaped slot 352, from the first U-shaped slot 351 to the first horizontal feed 341a, and from the vertical port 558 to the vertical port 538 can be described as a vertical transition.

In other embodiments, the transmission can be carried in the opposite direction. For example, the transmission can be carried from the first unit cell 300a to the interconnect phasing cell 400, to the second unit cell 300b, and to the THz transition/matching circuit cell 500. In these embodiments, the transmission terminates at the inner conductor 555 of the THz transition/matching circuit cell 500.

Figure 7:
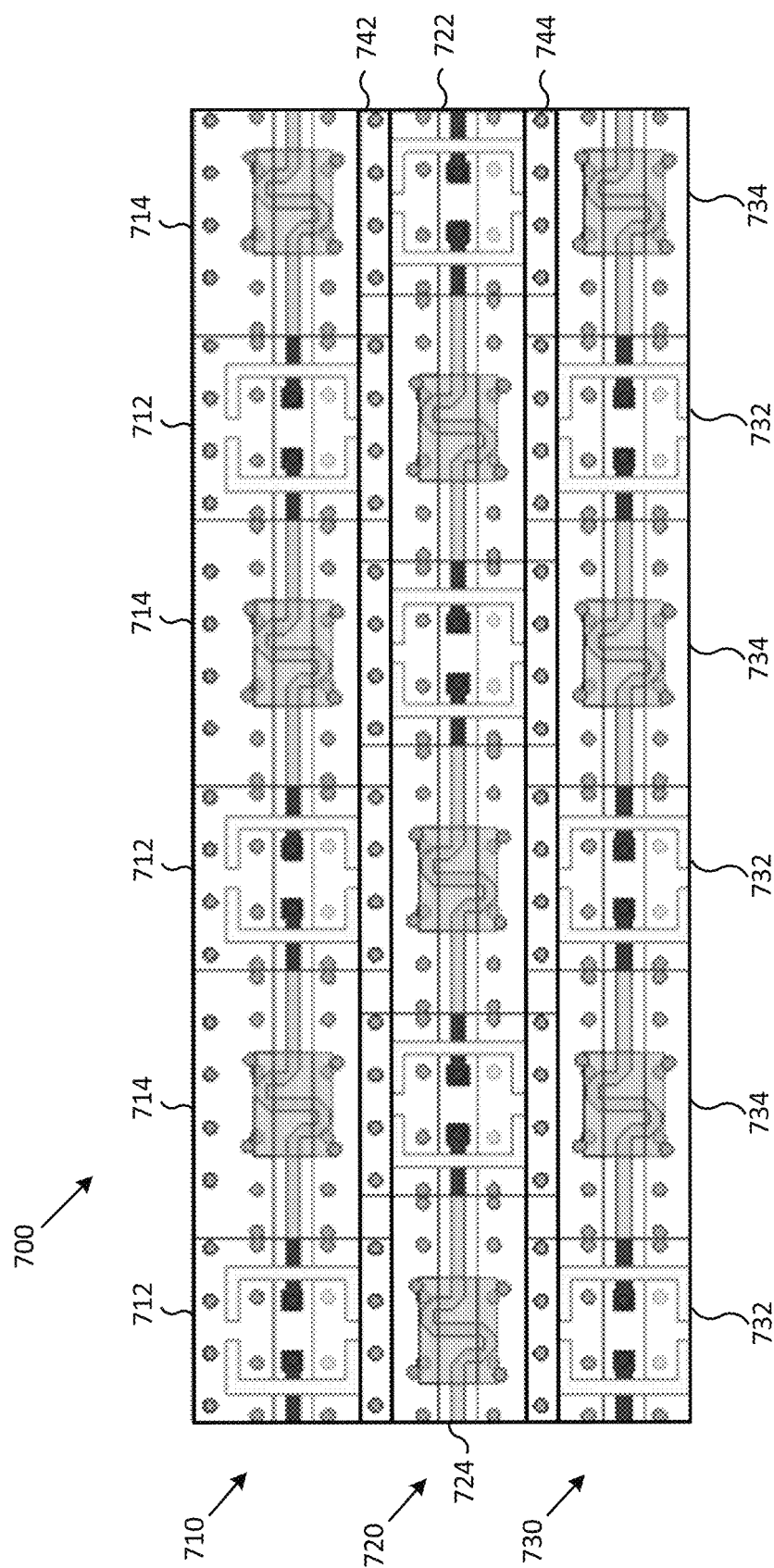
FIG. 7 illustrates an antenna including a plurality of linear antenna arrays according to various embodiments of the present disclosure.

The linear antenna array 600 can be used to develop a series-fed array for operation of an antenna, for example the antenna 700 described in the description of FIG. 7, at a THz frequency. For example, the interconnect phasing cell 400 can be used to apply a phase shift between adjacent series elements. More particularly, the interconnect phasing cell 400 can be used to apply a phase shift between a first unit cell 300 on one side of the interconnect phasing cell 400 and a second unit cell 300 on another side of the interconnect phasing cell 400.

Although each of the unit cells 300 illustrated in FIG. 6A include U-shaped slots in a squared-off shape, this embodiment should not be construed as limiting and various embodiments are possible. For example, some or all of the unit cells 300 in a linear antenna array 600 as illustrated in FIG. 6A can include U-shaped slots in a in a rounded shape such as illustrated in FIG. 3D.

FIG. 6B illustrates the termination of the linear antenna array 600 illustrated in FIG. 6A. The termination of the linear antenna array 600 shown in FIG. 6B is for illustration only and should not be construed as limiting. Various changes can be made to the termination of the linear antenna array 600 illustrated in FIG. 6A without departing from the scope of the present disclosure.

As shown in FIG. 6B, the THz transition/matching circuit cell 500 is coupled to a bond wires and matching circuit 610. The bond wires and matching circuit 610 is coupled to a transceiver 620. In various embodiments, the transceiver 620 can be the RF transceiver 210 illustrated in FIG. 2. The bond wires and matching circuit 610 can be any bond wire and matching circuit suitable for conveying the signal from the linear antenna array 600 to the transceiver 620 for transmission.

FIG. 7 illustrates an antenna including a plurality of linear antenna arrays according to various embodiments of the present disclosure. For example, the antenna 700 includes a plurality of linear antenna arrays 710, 720, 730 arranged in a staggered arrangement. Each of the plurality of linear antenna arrays 710, 720, 730 can be the linear antenna array 600 or include portions of the linear antenna array 600 described in FIG. 6A. The antenna 700 is an example of an EM structure that satisfies system requirements of THz communication systems in beyond 5G networks and 6G networks such as gain, bandwidth, efficiency, and beam-steering.

As shown in FIG. 7, the first linear antenna array 710 includes alternating unit cells 712 and interconnect phasing cells 714. Likewise, the second linear antenna array includes alternating unit cells 722 and interconnect phasing cells 724. Similarly, the third linear antenna array 730 includes alternating unit cells 732 and interconnect phasing cells 734. The antenna 700 is provided in a staggered arrangement such that each unit cell 712 of the first linear antenna array 710 is adjacent to an interconnect phasing cell 724 of the second linear antenna array 720. The interconnect phasing cell 724 of the second linear antenna array 720, which is adjacent to the unit cell 712 of the linear antenna array 710, is also adjacent to a unit cell 732 of the third linear antenna array 730. Each unit cell 712, 722, and 732 can be the unit cell 300. Each interconnect phasing cell 714, 724, and 734 can be an interconnect phasing cell 400.

Similarly, the antenna 700 is provided such that each interconnect phasing cell 714 of the first linear array 710 is adjacent to a unit cell 722 of the second linear antenna array 720. The unit cell 722 of the second linear antenna array 720, which is adjacent to the interconnect phasing cell 714 of the first linear antenna array 710, is also adjacent to an interconnect phasing cell 734 of the third linear antenna array 730.

Each of the linear arrays 710, 720, and 730 can be used to develop a series-fed array for operation of the antenna 700 at a THz frequency. For example, an interconnect phasing cell 714, 724, 734 can be used to apply a phase shift between adjacent series elements. More particularly, an interconnect phasing cell 714, 724, 734 can be used to apply a phase shift between a first unit cell 712, 722, and 732, respectively, on one side of the interconnect phasing cell 714, 724, 734 and a second unit cell 712, 722, and 732, respectively, on another side of the interconnect phasing cell 714, 724, 734.

In some embodiments, as shown in FIG. 7, the antenna 700 can include a row of posts in between each of the linear arrays 710, 720, and 730. The posts can be the posts 332, the posts 440, or the posts 540. For example, a first row 742 is provided between the first linear array 710 and the second linear array 720. A second row 744 is provided between the second linear array 720 and the third linear array 730. The rows 742, 744 of posts are arranged in order to provide additional fences between each of the linear arrays 710, 720, and 730 that reduce leakage, improve isolation, and reduce cross-talk between each of the linear arrays 710, 720, and 730. Although depicted in FIG. 7 as including a single row of posts between each linear array, various embodiments are possible. For example, the antenna 700 can include no additional posts between each linear array, one row of posts between each linear array, or more than one row of posts between each linear array.

Although each of the unit cells 712, 722, and 732 illustrated in FIG. 7 include U-shaped slots in a squared-off shape, the illustration should not be construed as limiting and various embodiments are possible. For example, some or all of the unit cells 712, 722, and 732 in an antenna 700 such as illustrated in FIG. 7 can include U-shaped slots in a in a rounded shape such as illustrated in FIG. 3D.

The antenna 700 is provided to provide maximum beam steering in the azimuth plane. In various embodiments, the antenna 700 provides a low-complexity beam-steering capability at the elevation plane. In various embodiments, the antenna 700 is neutral to the driving algorithm. The staggered arrangement of the linear arrays 710, 720, 730 controls undesired element coupling and reduces sub-array coupling.

As described herein, each particular unit cell 300, interconnect phasing cell 400, and transition/matching circuit cell 500 can be considered a distinct element. Although illustrated in FIG. 7 as including three linear arrays 710, 720, 730 each comprising three unit cells and three interconnect phasing cells, the description of FIG. 7 is for illustration only and should not be construed as limiting. For example, the antenna 700 can include more or fewer than three linear antenna arrays. Further, an antenna 700 can include more or fewer elements than shown in FIG. 7. For example, an antenna 700 can include one hundred or one thousand elements due to the highly isolated elements and sub-arrays to achieve higher radiated gain performance.

As described herein, an antenna can include a unit cell. The unit cell includes a radiating element, a dielectric substrate, and a feed network. The radiating element includes first and second slots. The dielectric substrate comprises a central cavity filled with a dielectric element. The feed network is disposed, positioned, or located proximate to the central cavity and between the dielectric element and the radiating element and comprises first and second horizontal feeds and first and second vertical feeds. The first and second horizontal feeds are separated by an air gap and a first vertical feed to feed a transmission to the first slot. The first and second vertical feeds are connected to the first and second horizontal feeds, respectively, and connected to feed first and second portions of the radiating element, respectively. The first and second portions of the radiating element are adjacent to the first and second slots, respectively.

In some embodiments, each of the first and second slots are U-shaped. In addition, each of the first and second portions of the radiating element are in between the first and second slots. In some embodiments, the unit cell further comprises a plurality of vertical posts in the dielectric substrate and connected to the radiating element, the plurality of vertical posts around a periphery of the unit cell.

In some embodiments, the antenna further comprises an interconnect phasing cell connected to the unit cell. The interconnect phasing cell includes a dielectric substrate comprising a central cavity filled with a dielectric element, an elevated plane including a first portion and a second portion, and a transmission line disposed, positioned, or located proximate to the central cavity and between the first portion and the second portion of the elevated plane. The transmission line can be connected to one of the first horizontal feed or the second horizontal feed. The transmission line can include a curved portion configured to adjust a coupling phase of a transmission by the unit cell.

In some embodiments, the antenna includes a plurality of series of unit cells, each of which are separated by interconnect phasing cells, respectively. The series of unit cells are adjacent one another and staggered such that unit cells of a first series are disposed to interconnect phasing cells of a second series, respectively.

In some embodiments, the interconnect phasing cell is between a first unit cell and a second unit cell such that the transmission line of the interconnect phasing cell connects to the second horizontal feed of the first unit cell and the first horizontal feed of the second unit cell to adjust a phase between the first unit cell and the second unit cell.

In some embodiments, the antenna further comprises a transition circuit. The transition circuit can include a dielectric substrate comprising a central cavity filled with a dielectric element, a first plane including a first portion and a second portion, a first transmission line proximate to the central cavity and between the first portion and the second portion of the first plane, the first transmission line including a termination point, and a second plane including a second transmission line comprising an initiation point corresponding to the termination point of the first transmission line. The first plane can be between the dielectric element and the second plane.

In some embodiments, the first transmission line of the transition circuit is connected to one of the first or second horizontal feeds of the unit cell. In some embodiments, the antenna further includes a bond wire and matching circuit connected to a transceiver, the bond wires and matching circuit connected to the second transmission line of the transition circuit.

In some embodiments, a base station includes a transceiver to transmit and receive signals and an antenna connected to the transceiver. The antenna can include a unit cell. The unit cell includes a radiating element, a dielectric substrate, and a feed network. The radiating element includes first and second slots. The dielectric substrate comprises a central cavity filled with a dielectric element. The feed network is proximate to the central cavity and between the dielectric element and the radiating element and comprises first and second horizontal feeds and first and second vertical feeds. The first and second horizontal feeds are separated by an air gap and a first vertical feed to feed a transmission to the first slot. The first and second vertical feeds are connected to the first and second horizontal feeds, respectively, and connected to feed first and second portions of the radiating element, respectively. The first and second portions of the radiating element are adjacent to the first and second slots, respectively.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle.

What is claimed is:

1. An antenna comprising:
   a unit cell including:
      a ground plate including first and second slots,
      a dielectric substrate comprising a central cavity filled with a dielectric element,
      a feed network proximate to the central cavity and between the dielectric element and the ground plate, the feed network comprising:
         first and second horizontal feeds separated by an air gap, and
         first and second vertical feeds separated by the air gap, the first and second vertical feeds connected to the first and second horizontal feeds, respectively, the first and second vertical feeds connected to feed first and second portions of the ground plate, respectively,
   wherein the first and second horizontal feeds are positioned on a first plane that is parallel to the dielectric substrate and the first and second vertical feeds are positioned on a second plane that is perpendicular to the dielectric substrate, and
   wherein the first and second portions of the ground plate are adjacent to the first and second slots, respectively.

2. The antenna of claim 1, wherein:
   the first and second slots are U-shaped, and
   the first and second portions of the ground plate are in between the first and second slots.

3. The antenna of claim 1, wherein the unit cell further comprises a plurality of vertical posts in the dielectric substrate and connected to the ground plate, the plurality of vertical posts around a periphery of the unit cell.

4. The antenna of claim 1, further comprising an interconnect phasing cell connected to the unit cell, the interconnect phasing cell including:
   a dielectric substrate comprising a central cavity filled with a dielectric element;
   an elevated plane including a first portion and a second portion; and
   a transmission line proximate to the central cavity of the interconnect phasing cell and between the first portion and the second portion of the elevated plane, the transmission line connected to one of the first horizontal feed or the second horizontal feed.

5. The antenna of claim 4, wherein the transmission line of the interconnect phasing cell comprises a curved portion configured to adjust a coupling phase of a transmission by the unit cell.

6. The antenna of claim 4, further comprising a plurality of series of unit cells, the unit cells in the series separated by interconnect phasing cells, respectively, the series of unit cells adjacent one another and staggered such that unit cells of a first series are adjacent to interconnect phasing cells of a second series, respectively.

7. The antenna of claim 4, wherein the interconnect phasing cell is between a first unit cell and a second unit cell such that the transmission line of the interconnect phasing cell connects to the second horizontal feed of the first unit cell and the first horizontal feed of the second unit cell to adjust a phase between the first unit cell and the second unit cell.

8. The antenna of claim 7, further comprising a transition circuit including:

a dielectric substrate comprising a central cavity filled with a dielectric element;
a first plane including a first portion and a second portion;
a first transmission line proximate to the central cavity and between the first portion and the second portion of the first plane, the first transmission line including a termination point; and
a second plane including a second transmission line comprising an initiation point corresponding to the termination point of the first transmission line, wherein the first plane is between the dielectric element and the second plane.

9. The antenna of claim 8, wherein the first transmission line of the transition circuit is connected to one of the first or second horizontal feeds of the unit cell.

10. The antenna of claim 8, further comprising a bond wire and matching circuit connected to a transceiver, the bond wires and matching circuit connected to the second transmission line of the transition circuit.

11. A base station comprising:
a transceiver; and
an antenna operably connected to the transceiver, the antenna including:
a unit cell including:
a ground plate including first and second slots,
a dielectric substrate comprising a central cavity filled with a dielectric element,
a feed network proximate to the central cavity and between the dielectric element and the ground plate, the feed network comprising:
first and second horizontal feeds separated by an air gap, and
first and second vertical feeds separated by the air gap, the first and second vertical feeds connected to the first and second horizontal feeds, respectively, the first and second vertical feeds connected to feed first and second portions of the ground plate, respectively,
wherein the first and second horizontal feeds are positioned on a first plane that is parallel to the dielectric substrate and the first and second vertical feeds are positioned on a second plane that is perpendicular to the dielectric substrate, and
wherein the first and second portions of the radiating element ground plate are adjacent to the first and second slots, respectively.

12. The base station of claim 11, wherein:
the first and second slots are U-shaped, and
the first and second portions of the ground plate are in between the first and second slots.

13. The base station of claim 11, wherein the unit cell further comprises a plurality of vertical posts in the dielectric substrate and connected to the ground plate, the plurality of vertical posts around a periphery of the unit cell.

14. The base station of claim 11, wherein the antenna further comprises an interconnect phasing cell connected to the unit cell, the interconnect phasing cell including:
a dielectric substrate comprising a central cavity filled with a dielectric element;
an elevated plane including a first portion and a second portion; and
a transmission line proximate to the central cavity of the interconnect phasing cell and between the first portion and the second portion of the elevated plane, the transmission line connected to one of the first horizontal feed or the second horizontal feed.

15. The base station of claim 14, wherein the transmission line of the interconnect phasing cell comprises a curved portion configured to adjust a coupling phase of a transmission by the unit cell.

16. The base station of claim 14, wherein the antenna further comprises a plurality of series of unit cells, the unit cells in the series separated by interconnect phasing cells, respectively, the series of unit cells adjacent one another and staggered such that unit cells of a first series are adjacent to interconnect phasing cells of a second series, respectively.

17. The base station of claim 14, wherein the interconnect phasing cell is between a first unit cell and a second unit cell such that the transmission line of the interconnect phasing cell connects to the second horizontal feed of the first unit cell and the first horizontal feed of the second unit cell to adjust a phase between the first unit cell and the second unit cell.

18. The base station of claim 17, wherein the antenna further comprises a transition circuit including:
a dielectric substrate comprising a central cavity filled with a dielectric element;
a first plane including a first portion and a second portion;
a first transmission line proximate to the central cavity and between the first portion and the second portion of the first plane, the first transmission line including a termination point; and
a second plane including a second transmission line comprising an initiation point corresponding to the termination point of the first transmission line, wherein the first plane is between the dielectric element and the second plane.

19. The base station of claim 18, wherein the first transmission line of the transition circuit is connected to one of the first or second horizontal feeds of the unit cell.

20. The base station of claim 18, wherein the antenna further comprises a bond wire and matching circuit connected to a transceiver, the bond wires and matching circuit connected to the second transmission line of the transition circuit.

* * * * *